US008587634B1

(12) United States Patent
Baldino et al.

(10) Patent No.: US 8,587,634 B1
(45) Date of Patent: Nov. 19, 2013

(54) SYSTEM AND METHOD FOR INTELLIGENT MODE SWITCHING IN A COMMUNICATIONS ENVIRONMENT

(75) Inventors: Brian J. Baldino, Milpitas, CA (US); Michael B. Hubenthal, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1038 days.

(21) Appl. No.: 12/333,804

(22) Filed: Dec. 12, 2008

(51) Int. Cl.
*H04N 7/15* (2006.01)
(52) U.S. Cl.
CPC ........................................ *H04N 7/15* (2013.01)
USPC .................. 348/14.08; 348/14.09; 348/14.12
(58) Field of Classification Search
USPC ............ 348/14.01–14.16; 704/270, 275, 277; 715/719, 753
See application file for complete search history.

(56) References Cited

U.S. PATENT DOCUMENTS

| | | | |
|---|---|---|---|
| 6,980,526 B2 | 12/2005 | Jang et al. | |
| 7,081,915 B1 * | 7/2006 | Hamilton | 348/14.08 |
| 2003/0149724 A1 * | 8/2003 | Chang | 709/204 |
| 2006/0136224 A1 * | 6/2006 | Eaton et al. | 704/277 |
| 2008/0218582 A1 * | 9/2008 | Buckler | 348/14.08 |
| 2008/0218682 A1 * | 9/2008 | Hogen et al. | 351/113 |
| 2008/0266380 A1 * | 10/2008 | Gorzynski et al. | 348/14.08 |
| 2008/0267282 A1 * | 10/2008 | Kalipatnapu et al. | 375/240.01 |
| 2008/0312923 A1 * | 12/2008 | Crinon et al. | 704/246 |
| 2009/0210789 A1 * | 8/2009 | Thakkar et al. | 715/719 |
| 2009/0244257 A1 * | 10/2009 | MacDonald et al. | 348/14.09 |

* cited by examiner

*Primary Examiner* — Melur Ramakrishnaiah
(74) *Attorney, Agent, or Firm* — Patent Capital Group

(57) ABSTRACT

A method is provided in one example embodiment and includes receiving data associated with a plurality of endpoints that are engaged in a video conference, and evaluating whether a first endpoint and a second endpoint of the plurality have entered into a conversation such that a conversation mode is triggered. Once the conversation mode is entered, the first and second endpoints of the conversation are rendered on two different screens of a video display. In more specific embodiments, the method includes analyzing active speaker patterns of some of the endpoints to determine whether to enter into the conversation mode. In still other embodiments, the method includes determining whether the rendering on the two different screens is temporary or made permanent for a duration of the video conference.

22 Claims, 3 Drawing Sheets

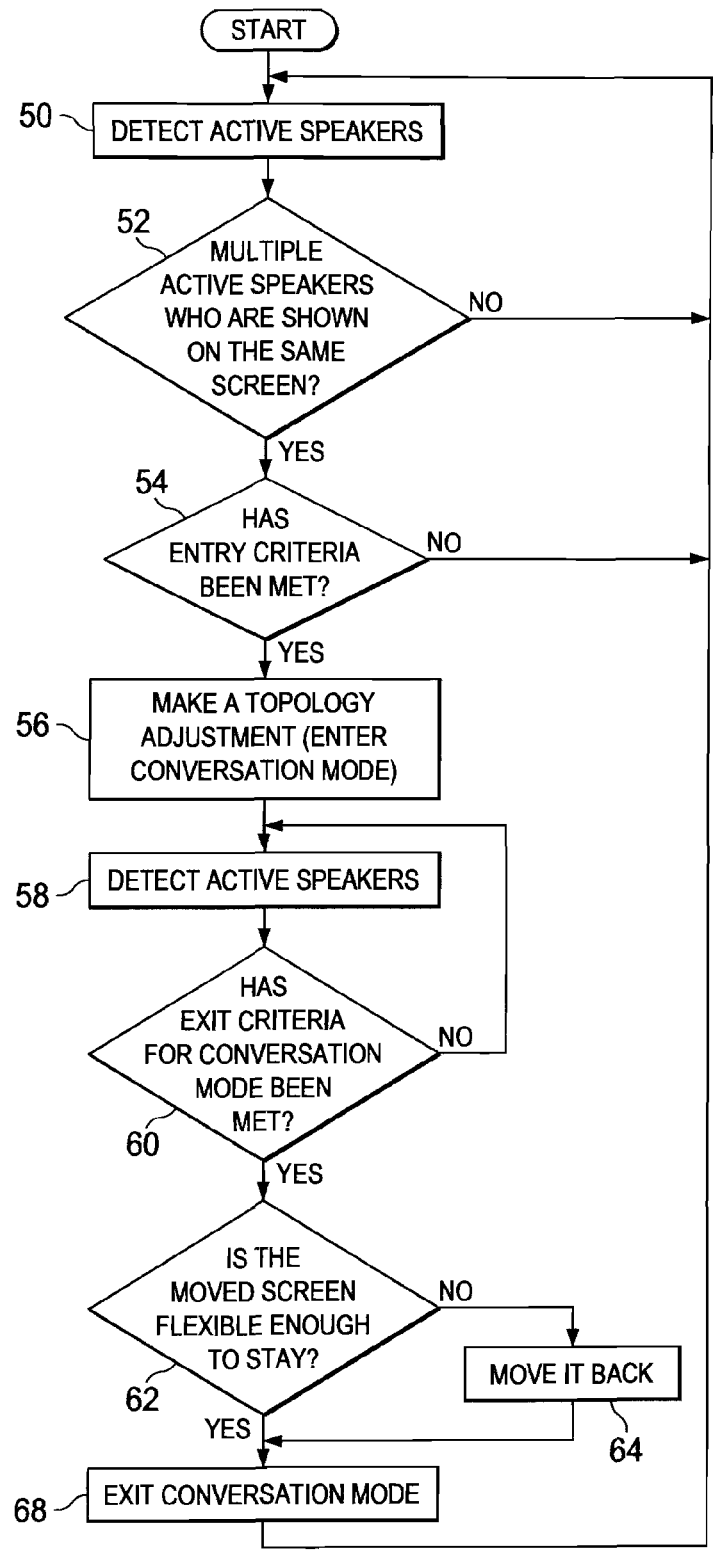

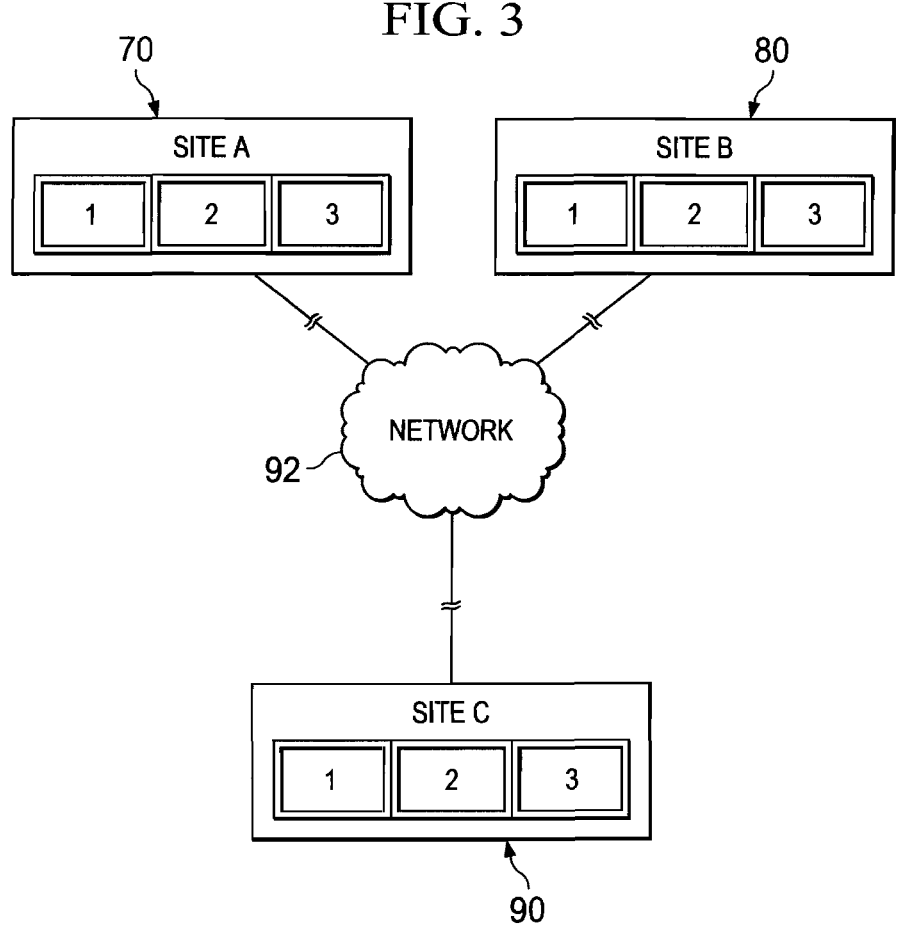

SYSTEM AND METHOD FOR INTELLIGENT MODE SWITCHING IN A COMMUNICATIONS ENVIRONMENT

TECHNICAL FIELD OF THE INVENTION

This invention relates in general to the field of communications and, more particularly, to a system and a method for intelligent mode switching in a communications environment.

BACKGROUND OF THE INVENTION

Video services have become increasingly important in today's society. In certain architectures, service providers may seek to offer sophisticated video conferencing services for their end users. The video conferencing architecture can offer an "in-person" meeting experience over a network. Video conferencing architectures can deliver real-time, face-to-face interactions between people using advanced visual, audio, and collaboration technologies. These technologies can transmit life-size, high-definition images, and spatial discrete audio. Specially designed, high-definition cameras can provide quality, high-definition images with superior eye contact. The audio facilitates a full, natural conversation with no perceivable latency.

Some issues have arisen in video conferencing scenarios when the imaging shifts to a set of individuals who are engaged in some type of conversation. Important to this scenario is how these individuals should be rendered to the rest of the audience while the conversation occurs. This presents a significant challenge to developers and designers, who attempt to offer a video conferencing solution that is realistic and that mimics a real-life meeting.

Thus, the ability to develop a system or a protocol that offers an effective architecture for video conferencing activities provides a significant challenge to network designers, component manufacturers, service providers, and system administrators alike.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 2 is a simplified flowchart illustrating a series of example steps associated with the communication system; and FIG. 3 is a simplified block diagram of an example scenario for mode switching in a communications environment in accordance with one embodiment of the present invention.

DETAILED DESCRIPTION OF EXAMPLE EMBODIMENTS

Overview

Figure 1:
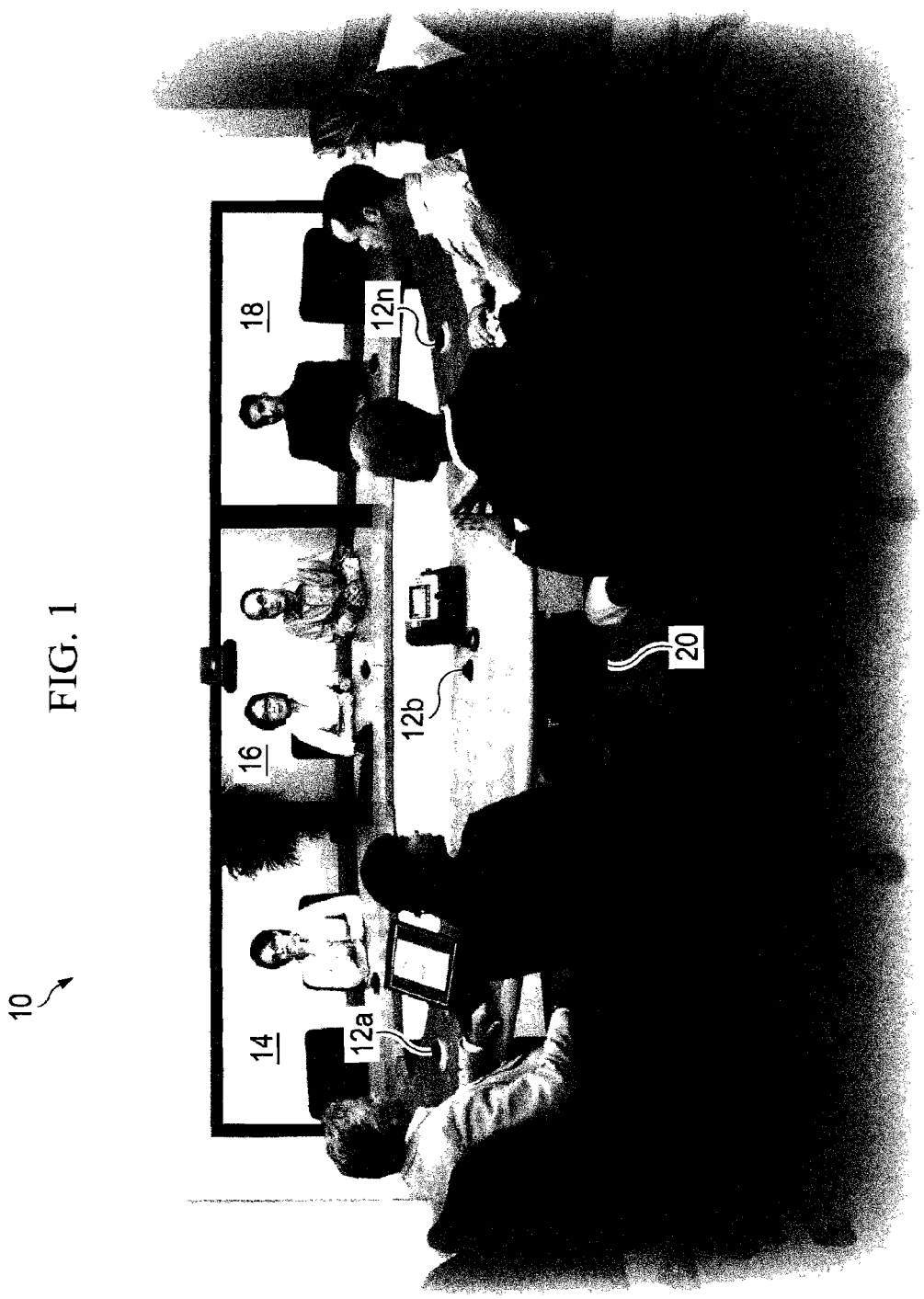
FIG. 1 is a simplified block diagram of a communication system for intelligently switching modes in a communications environment in accordance with one embodiment of the present invention.

A method is provided in one example embodiment and includes receiving data associated with a plurality of endpoints that are engaged in a video conference, and evaluating whether a first endpoint and a second endpoint of the plurality have entered into a conversation such that a conversation mode is triggered. Once the conversation mode is entered, the first and second endpoints of the conversation are rendered on two different screens of a video display. In more specific embodiments, the method includes analyzing active speaker patterns of some of the endpoints to determine whether to enter into the conversation mode. In still other embodiments, the method includes determining whether the rendering on the two different screens is temporary or made permanent for a duration of the video conference.

Turning to FIG. 1, FIG. 1 is a simplified block diagram of a communication system 10 for intelligent mode switching in a communications environment. FIG. 1 includes multiple endpoints 12a-n, which are coupled to a manager element 20. Note that the numerical designations assigned to the endpoints do not connote any type of hierarchy; the designations are arbitrary and have been used for purposes of teaching only. These designations should not be construed in any way to limit their capabilities, functionalities, or applications in the potential environments that may benefit from the features of communication system 10.

In one example implementation, the endpoints are video conferencing endpoints, which can assist in receiving and communicating video and audio data. Other types of endpoints are certainly within the broad scope of the present invention and some of these example endpoints are further described below.

Manager element 20 is a multipoint device that can establish a conversation or a call between one or more end users, which may be located in various other sites and locations. Manager element 20 can also coordinate and process various policies involving endpoints 12. Manager element 20 includes a switching component that determines which streams are to be routed to individual endpoints 12. Manager element 20 can also determine how individual end-users are seen by others involved in the video conference. Furthermore, manager element 20 can control the timing and coordination of this activity. Manager element 20 can also include a media layer that can copy information or data, which can be subsequently retransmitted or simply forwarded along to one or more endpoints 12.

As illustrated in FIG. 1, a number of screens 14, 16, and 18 are provided for the conference. These screens render images to be seen by the endpoints. Note that as used herein in this Specification, the term 'screen' is meant to connote any element that is capable of rendering an image during a video conference. This would necessarily be inclusive of any panel, plasma element, television, monitor, display, or any other suitable element that is capable of such rendering. Similarly, as used herein in this Specification, the term 'render' is meant to connote any type of projection, display, illumination, or imaging of video information.

In the example of FIG. 1, endpoints 12 are participating in a video conference. On each of the screens, 14, 16, and 18 counterparties are shown participating in the video conference. At each respective location, one or more screens may be configured to display video data from other endpoints participating in the video conference such that a continuous meeting (inclusive of audio and video data) occurs between endpoints 12.

Note that before turning to the example flows and infrastructure of example embodiments of the present invention, a brief overview of the video conferencing architecture is provided for the audience. The components of the video conferencing architecture of FIG. 1 use technologies in conjunction with specialized applications and hardware to create a solution that can leverage the network. This video conferencing architecture can use the standard IP technology deployed in corporations and can run on an integrated voice, video, and data network. The system can also support high quality, real-time voice, and video communications with branch offices using broadband connections. It can further offer capabilities for ensuring quality of service (QoS), security, reliability, and high availability for high-bandwidth applications such as video. Power and Ethernet connections for all participants can be provided. Participants can use their laptops to access critical data for the meeting, join a meeting place protocol or a Web session, or stay connected to other applications throughout the meeting.

Manager element 20 can control what is seen on each individual screen. It chooses which images and which video feeds should be rendered on each screen. In addition, manager element 20 makes decisions about which people will be shown on each individual screen, as they participate and/or speak during the video conference. In one example embodiment involving three screens (referred to as a "triple"), a simple eye gazing protocol can be employed such that as participants look inward during a video conference, the right panel will show images from the left side of the counterparty's environment, the left side will show images from the right side of the counterparty's environment, and the center will render the center image from the counterparty's environment. Thus, the present invention accommodates a 'continuous room' protocol, where people are accurately being depicted based on their current position. Note also that in many video conferencing scenarios, one or more algorithms may dictate that the loudest speaker will be shown on a given screen. Communication system 10 can employ such a protocol, or use others to dictate who should be shown on individual panels. If a conversation mode is triggered, then this protocol would temporarily cease and a different (optimal) protocol could be employed, as detailed below.

A number of problems may arise in such a video architecture. Recall that the video conferencing architecture is meant to make video conferencing life-like so that participants feel as if they are in the same room as the other participants. Multipoint scenarios, where conferences often consist of more than two participants, have challenges because there are often more speakers than there are displays in a single room. Some video conferencing solutions solve this problem by shrinking all participants down and putting them all on a single screen. However, that response fails to achieve the chief goal of showing life size images and creating the vision that participants are in the same room.

Practically, while switching back and forth between active speakers, it can be difficult to follow a conversation between two people if they are being shown on the same screen. As they converse, they are either being switched back and forth, or both participants are heard but only one of them is seen. This is not the experience one would see in a conference room. In a conference room, an observer would see both participants facing each other: having a conversation.

In accordance with the teachings of the present invention, communication system 10 detects a conversation scenario and accounts for that in the following manner. Concisely stated, communication system 10 can systematically analyze active speaker patterns to determine conversation participants and, further, intelligently show that conversation to other conference participants. This mimics an actual, live meeting, which is the objective in such an architecture.

Before turning to some of the operations of this architecture, a brief discussion is provided about some of the infrastructure of FIG. 1. Endpoint 12a is a client or customer wishing to participate in a video conference in communication system 10. The term 'endpoint' may be inclusive of devices used to initiate a communication, such as a switch, a console, a proprietary endpoint, a telephone, a bridge, a computer, a personal digital assistant (PDA), a laptop or electronic notebook, or any other device, component, element, or object capable of initiating voice, audio, or data exchanges within communication system 10. Endpoint 12a may also be inclusive of a suitable interface to the human user, such as a microphone, a display, or a keyboard or other terminal equipment. Endpoint 12a may also include any device that seeks to initiate a communication on behalf of another entity or element, such as a program, a database, or any other component, device, element, or object capable of initiating a voice or a data exchange within communication system 10. Data, as used herein in this document, refers to any type of video, numeric, voice, or script data, or any type of source or object code, or any other suitable information in any appropriate format that may be communicated from one point to another.

Manager element 20 is a switch in one example implementation that executes some of the video conferencing activities, as explained herein. In other scenarios, manager element 20 could be virtually any network element, a proprietary device, or anything that is capable of facilitating an exchange or coordination of video and/or audio data. As used herein in this Specification, the term 'manager element' is meant to encompass switches, servers, routers, gateways, bridges, loadbalancers, or any other suitable device, network appliance, component, element, or object operable to exchange or process information in a video conferencing environment. Moreover, manager element 20 may include any suitable hardware, software, components, modules, interfaces, or objects that facilitate the operations thereof. This may be inclusive of appropriate algorithms and communication protocols that allow for the effective delivery and coordination of data or information.

Manager element 20 can be equipped with appropriate software to execute the described operations in an example embodiment of the present invention. Memory elements and processors (which facilitate these outlined operations) may be included in this device or be provided externally to this device, or consolidated in any suitable fashion. The processors can readily execute code (software) for effectuating the activities described.

The memory elements can store information to be referenced by manager element 20. As used herein in this document, the term 'memory element' is inclusive of any suitable database or storage medium (provided in any appropriate format) that is capable of maintaining information pertinent to the coordination and/or processing operations of manager element 20. For example, the memory elements may store such information in an electronic register, diagram, record, index, list, or queue. Alternatively, the memory elements may keep such information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

As identified earlier, in one example implementation, manager element 20 includes software to achieve the optimal video conferencing operations, as outlined herein in this document. Additionally, endpoint 12a may include some software (e.g., reciprocating software or software that assists in the collection of heuristic data, analyzing of data, etc.) to help coordinate the video conferencing activities explained herein. In other embodiments, this processing and/or coordination feature may be provided external to these devices (manager element 20 and endpoint 12a) or included in some other device to achieve this intended functionality. Alternatively, both manager element 20 and the peer endpoints include this software (or reciprocating software) that can coordinate in order to achieve the operations, as outlined herein.

Turning back now to the operational aspects of example embodiments of the present invention, manager element 20 can analyze active speaker patterns and identify if two people [amongst the group] are having a 'conversation.' As used herein in the Specification, this scenario involving a conversation between at least two people is referred to as a "conversation mode." Once this mode is detected, communication system 10 can take appropriate action for other endpoints that are observing the conversation. In these cases, manager element 20 can move conversation participants so they are seen on different screens: allowing observers to watch both sides of the conversation continuously. This is in contrast to switching back and forth between each person, or hearing both participants but seeing only one.

Since manager element 20 strives to maintain balance and gaze alignment when placing speakers on screens, the system can intelligently choose not only which speaker to reposition (the system can move whichever is more flexible [e.g., the center of a single is more flexible than left or right segments from a triple, etc.]), but the system can also decide if the repositioning should be temporary or permanent. For example, if user A is seated at a triple, watching user B and user C have a conversation, both user B and user C are shown on user A's left screen. User B occupies the right segment of a triple, whereas C is the center segment of a single. Manager element 20 can recognize a conversation is taking place and, further, that user C has more flexibility to be repositioned such that the system moves it to the center of user A's triple. User A is now able to easily watch both participants in the conversation. Due to C's flexibility and perhaps a history of conversations with user B, the manager element 20 may decide it is appropriate to leave user C in its repositioned state. However, if user C was also seated on the right side of a triple (just as user B), the repositioning could be executed when then conversation mode was entered, but reversed back to normal when the mode was exited.

The criteria to enter into a 'conversation mode' could be of varying sensitivity and could be configured based on particular needs. In one example, the conversation mode could be triggered through the assistance of endpoint inputs to make sure the transition into 'conversation mode' was smooth and not disruptive to the end users in the audience. In one specific example embodiment, after two or three transitions back and forth between two users, the system assumes they are in a conversation and the 'conversation mode' is initiated. If there were a more open discussion occurring (where more than two participants were talking), a variety of paths could be taken. For example, the topology changes could still take effect with up to 'n' conversation participants, where 'n' represents the number of screens available on an endpoint, i.e. all participants could be seen at once, even if previously they were all seen on a single screen. Once the conversation grows sufficiently large and moves back to a 'group discussion' rather than a conversation, the conversation mode would be exited and the system would return back to normal switching modes. This represents a more balanced state and the system reverts to this state once an exit criterion has been met. The normal conferencing mode could include more typical group conferencing interactions, where the conversation mode is not necessarily being used.

In more specific terms, manager element 20 can perform one or more of the following operations in making a conversation mode determination (entry or exit). Initially, audio streams can be collected or aggregated from the endpoints. One or more of the packets from these flows include a number at their respective ends. That number signifies how loud the audio stream is for the speaker associated with that audio data. That information can be used to drive or to influence the switching that occurs during the video conference. In one example embodiment, heuristics can be leveraged in order to remember certain speech (or group) patterns. In addition, manager element 20 can analyze the people that are speaking and make an intelligent decision based on two participants who appear to be competing for the same screen. Manager element 20 includes a heuristics tracker that can receive multiple feeds from audio and/or video data. The heuristics tracker, in one example embodiment, follows who is talking and can also identify when two participants are speaking at approximately the same time. Additionally, such a tracking element can also pick up on competitive speaking, heightened loudness, overlapping dialogue, or rapid speech retorts. Any such criteria could be used as a trigger for entering into a conversation mode being accommodated by communication system 10.

Once an entry criterion is met for the conversation mode, then the rendering protocol can be initiated or triggered. For example, the topology can be adjusted temporarily (or permanently, for some configurable time interval, for some time percentage, etc.) to account for the conversation mode. Consider if two people are being shown on a single screen at a destination, and if this occurs for 45 seconds, the entry criteria would have been effectively met. This would signal that the end-users have interacted for a certain amount of time such that an adjustment needs to be made for some of the audience members at other sites. Effectively, manager element 20 is recognizing that the visual situation [during the video conference] is deficient enough that it warrants being addressed or adjusted in some way.

Such a protocol could involve simply moving one participant to the center screen and a second participant to a right screen as they engage in a conversation between each other. More importantly, at other locations where end-users are participating in the video conference, that audience will be able to see these two participants engaged in the conversation in a realistic fashion. This would effectively avoid the haphazard switching that would otherwise occur, or the scenario in which one participant would receive the entire focus of the architecture based on a loudness parameter.

Note also that manager element 20 is smart enough to identify when this conversation mode should be ended. Manager element 20 is acknowledging that the dialogue between two participants (as they engaged in a somewhat exclusive conversation) has ceased. In addition, manager element 20 can also review this activity from a long-term perspective. For example, manager element 20 can quickly audit previous information in order to determine that potentially, these two speakers have been in multiple competitive conversations. If that is the case, and if the eye gazing protocol permits, these two competitive speakers can remain on their respective screens. In a sense, manager element 20 is predicting that shortly, a similar conversation mode scenario will emerge such that these two speakers will be engaged in a competitive conversation, which would be rendered realistically to the other members of the audience. If in fact the history dictates that this was a simple random occurrence between these two individuals, then manager element 20 could populate these two speakers back into the group system and resume normal communications.

Note that once the conversation mode has been entered such that the intelligent rendering of two competing individuals has been made, then the protocol enters into a monitoring state to identify an appropriate time to exit this mode. For example, if the two competitive individuals have stopped talking for several seconds, or stopped talking for 20% of the last 15 seconds, the exit criteria could theoretically be met and manager element 20 can resume normal communications. Any suitable parameters could be used to enter and to exit the conversation mode, as these examples are only offering one of a multitude of possibilities that could be employed by communication system 10.

In terms of advantages, communication system 10 offers a more realistic depiction of a meeting between multiple participants. This is achieved by intelligently and rapidly determining two (or more) sides of a conversation and adjusting the topology appropriately. This can better simulate the feel of a conversation that occurs in an actual conference room. In flawed implementations, participants outside of a conversation may get confused because it may appear that those participating in a conversation are looking directly at them and may appear to be talking to them (since the other person may be seeing someone different on their screen). By intelligently positioning participants on screens, there is no confusion regarding to whom either participant is speaking, as the situation now more closely mirrors a real-life meeting scenario, where the interaction becomes obvious.

Turning to an operational perspective of the present invention, FIG. 2 is a simplified flowchart illustrating one example flow associated with communication system 10. Before turning to this particular flow, it is important to understand some of the active speaker protocols that may be implemented in conjunction with such activities. Active speech switching entails a damping period where audio information is being heard, but the speakers are not necessarily being seen. When someone begins speaking, their video is typically fed into the conference. Normally there is a time interval that needs to be met before speech for that participant is fed into the conference (e.g., 2 seconds). Voice activity detection (VAD) refers to general loudness parameters that can be used in order to detect speech activity and it can be used in making switching decisions. These VAD values are generally used to make a quick decision about which speaker to render on the panels. Now, manager element 20 can remember, analyze, store, and continue to use these VAD values in making future decisions about how to enter into the conversation mode, as explained herein.

For example, manager element 20 can review the last sixty VAD values and see that a certain portion of those values has been allocated to one speaker (33 values). Similarly, manager element 20 can also see that a second speaker is frequently appearing in these recent values (e.g., 21 values). This would indicate to the system that both of these individuals are speaking and, potentially, the conversation mode should be entered. A second inquiry asks how these individuals are currently being rendered on the given panels.

Turning now to FIG. 2, which is illustrative of some of these activities, the flow begins at step 50, where the system detects active speakers. The flow moves to step 52, where the system asks if multiple active speakers are being shown on the same screen. If the answer to this inquiry is 'No' then the flow returns back to the previous step. If this question is answered affirmatively, then the flow moves to step 54, where a second inquiry is made about whether an entry criteria has been met. If it has, then the flow continues to step 56 and a topology adjustment is made (or a conversation mode is entered, which would adjust the topology of the screens). This conversation mode can include the intelligent rendering of individual speakers participating in a video conference. This includes the competitive conversation accommodation (i.e., conversation mode) that is executed by manager element 20 such that a more realistic visual display is provided to audience members of the video conference.

At step 58, the system detects active speakers. If this question is answered affirmatively, the system asks a second question as to whether the exit criteria for the conversation mode have been met: this is reflected at step 60. If that criteria has been met, then the flow moves to step 62, where the system asks if the moved screen is flexible enough to stay in its current condition. If the answer to this question is negative, then at step 64 the moved screen is moved back. If the answer to this question is 'Yes,' then at step 68 the conversation mode is exited.

FIG. 3 is a simplified block diagram involving another example scenario that can be performed using some of the capabilities of communication system 10. FIG. 3 includes site A 70, site B 80, site C 90, and a network 92, which couples all of these sites together through a communication platform. Network 92 represents a series of points or nodes of interconnected communication paths for receiving and transmitting packets of information that propagate through communication system 10. Network 92 offers a communicative interface between sites (and/or endpoints) and may be any LAN, WLAN, MAN, WAN, or any other appropriate architecture or system that facilitates communications in a network environment. Network 92 implements a TCP/IP communication language protocol in a particular embodiment of the present invention; however, network 92 may alternatively implement any other suitable communication protocol for transmitting and receiving data packets within communication system 10. Note also that network 92 can accommodate any number of ancillary activities that can accompany the video conference. For example, this network connectivity can facilitate all informational exchanges (e.g., notes, virtual white boards, PowerPoint presentations, e-mailing, word processing applications, etc.).

Each of these sites includes three screens in this example embodiment. Site C sees both A1 and B1 on its C1 screen. The particular scenario for this example flow occurs during a conference, where A1 and B1 begin having a conversation. The problem occurs on site C, where either A1 or B1 switch back and forth repeatedly, or one of these endpoints talk so loudly that the system stays switched to one individual. In that scenario, both endpoints are being heard, but only one endpoint is being seen.

Manager element 20 can take the following steps to address and solve this dilemma. Once the system detects a conversation is taking place between two participants who were shown on the same screen, the system takes remedial action. One endpoint is moved to another screen, for example, in the scenario involving the three sites as outlined previously, the system would move B1 to screen C2 such that cite C can see A1 and B1 at the same time. Once the conversation is over (i.e., some exit criteria has been met), B1 can be moved back to its original spot, or it can be left on that spot, depending on some flexibility that is offered by the system's topology. In this sense, the system can continue to seamlessly toggle between a normal mode of video conferencing and a conversation mode. This can occur with minimal or no end user involvement, as the system can perform this intelligent switching autonomously.

Note that with the example provided above, as well as numerous other examples provided herein, interaction may be described in terms of two or three elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of endpoints, as well as more complicated/sophisticated arrangements and configurations. Accordingly, the examples provided should not limit the scope or inhibit the broad teachings of communication system 10 as potentially applied to a myriad of other architectures.

It is also important to note that the steps in FIGS. 2-3 illustrate only some of the possible scenarios that may be executed by, or within, communication system 10. Some of these steps may be deleted or removed where appropriate, or these steps may be modified or changed considerably without departing from the scope of the present invention. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present invention.

Although the present invention has been described in detail with reference to particular embodiments, it should be understood that various other changes, substitutions, and alterations may be made hereto without departing from the spirit and scope of the present invention. For example, although the present invention has been described as operating in video conferencing environments or arrangements, the present invention may be used in any communications environment that could benefit from such technology. Virtually any configuration that seeks to intelligently provision a set of images could enjoy the benefits of the present invention. Moreover, the invention can be implemented in any system providing voice and video for one or more endpoints.

Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112a as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. A method, comprising:
   receiving data associated with a plurality of endpoints that are engaged in a video conference; and
   evaluating whether a first endpoint and a second endpoint of the plurality have entered into a conversation such that a conversation mode is triggered, and wherein once the conversation mode is entered, the first and second endpoints of the conversation are respectively rendered on first and second screens of a video display and wherein selection of the first and second screens from a plurality of screens on which to render the first and second endpoints, respectively, is performed in a manner that takes into account maintaining gaze alignment between the first and second endpoints;
   wherein prior to entering conversation mode, multiple endpoints may be displayed on at least one of the first and second screens and during conversation mode, no endpoint other than the first endpoint is displayed on the first screen and no endpoint other than the second endpoint is displayed on the second screen.

2. The method of claim 1, further comprising:
   analyzing active speaker patterns of some of the endpoints to determine whether to enter into the conversation mode.

3. The method of claim 1, further comprising:
   determining whether the rendering on the two different screens is temporary or made permanent for a duration of the video conference.

4. The method of claim 1, wherein speaker loudness information is used to make a decision as to whether to enter into the conversation mode.

5. The method of claim 1, wherein heuristic information is reviewed to make a decision as to whether to enter into the conversation mode.

6. The method of claim 5, wherein the heuristic information is stored such that certain speech patterns can be used for future determinations as to whether to enter into the conversation mode.

7. The method of claim 1, further comprising:
   employing a heuristics tracker that follows which endpoint is speaking and when two endpoints are speaking at approximately a same time, wherein the heuristics tracker can identify competitive speaking, heightened loudness, overlapping dialogue, or rapid speech retorts to be used in making a decision as to whether to enter into the conversation mode.

8. The method of claim 1, wherein voice activity detection (VAD) values are used to determine whether to enter into the conversation mode.

9. The method of claim 1, further comprising:
   exiting the conversation mode after the first and second endpoints have ceased exchanging audio data for a time interval such that a normal video conferencing mode is entered.

10. An apparatus, comprising:
    a manager element that receives data associated with a plurality of endpoints that are engaged in a video conference, the manager element evaluating whether a first endpoint and a second endpoint of the plurality have entered into a conversation such that a conversation mode is triggered, and wherein once the conversation mode is entered, the first and second endpoints of the conversation are respectively rendered on first and second screens of a video display and wherein selection of the first and second screens from a plurality of screens on which to render the first and second endpoints, respectively, is performed in a manner that takes into account maintaining gaze alignment between the first and second endpoints;
    wherein prior to entering conversation mode, multiple endpoints may be displayed on at least one of the first and second screens and during conversation mode, no endpoint other than the first endpoint is displayed on the first screen and no endpoint other than the second endpoint is displayed on the second screen.

11. The apparatus of claim 10, wherein the manager element analyzes active speaker patterns of some of the endpoints to determine whether to enter into the conversation mode.

12. The apparatus of claim 10, wherein the manager element determines whether the rendering on the two different screens is temporary or made permanent for a duration of the video conference.

13. The apparatus of claim 10, wherein speaker loudness information is used to make a decision as to whether to enter into the conversation mode.

14. The apparatus of claim 10, wherein heuristic information is reviewed to make a decision as to whether to enter into the conversation mode, and wherein the heuristic information is stored such that certain speech patterns can be used for future determinations as to whether to enter into the conversation mode.

15. The apparatus of claim 10, further comprising:
a heuristics tracker that follows which endpoint is speaking and when two endpoints are speaking at approximately a same time, wherein the heuristics tracker can identify competitive speaking, heightened loudness, overlapping dialogue, or rapid speech retorts to be used in making a decision as to whether to enter into the conversation mode.

16. Logic encoded in one or more tangible media for execution and when executed by a processor operable to:
receive data associated with a plurality of endpoints that are engaged in a video conference; and
evaluate whether a first endpoint and a second endpoint of the plurality have entered into a conversation such that a conversation mode is triggered, and wherein once the conversation mode is entered, the first and second endpoints of the conversation are respectively rendered on first and second screens of a video display and wherein selection of the first and second screens from a plurality of screens on which to render the first and second endpoints, respectively, is performed in a manner that takes into account maintaining gaze alignment between the first and second endpoints;
wherein prior to entering conversation mode, multiple endpoints may be displayed on at least one of the first and second screens and during conversation mode, no endpoint other than the first endpoint is displayed on the first screen and no endpoint other than the second endpoint is displayed on the second screen.

17. The logic of claim 16, wherein the code is further operable to:
analyze active speaker patterns of some of the endpoints to determine whether to enter into the conversation mode; and
determine whether the rendering on the two different screens is temporary or made permanent for a duration of the video conference.

18. The logic of claim 16, wherein speaker loudness information is used to make a decision as to whether to enter into the conversation mode.

19. The logic of claim 16, wherein heuristic information is reviewed to make a decision as to whether to enter into the conversation mode, and wherein the heuristic information is stored such that certain speech patterns can be used for future determinations as to whether to enter into the conversation mode.

20. A system, comprising:
means for receiving data associated with a plurality of endpoints that are engaged in a video conference; and
means for evaluating whether a first endpoint and a second endpoint of the plurality have entered into a conversation such that a conversation mode is triggered, and wherein once the conversation mode is entered, the first and second endpoints of the conversation are respectively rendered on first and second screens of a video display and wherein selection of the first and second screens from a plurality of screens on which to render the first and second endpoints, respectively, is performed in a manner that takes into account maintaining gaze alignment between the first and second endpoints;
wherein prior to entering conversation mode, multiple endpoints may be displayed on at least one of the first and second screens and during conversation mode, no endpoint other than the first endpoint is displayed on the first screen and no endpoint other than the second endpoint is displayed on the second screen.

21. The system of claim 20, further comprising:
means for analyzing active speaker patterns of some of the endpoints to determine whether to enter into the conversation mode;
means for determining whether the rendering on the two different screens is temporary or made permanent for a duration of the video conference; and
means for exiting the conversation mode after the first and second endpoints have ceased exchanging audio data for a time interval such that a normal video conferencing mode is entered.

22. The system of claim 20, wherein one or more packets included in the data include a number at their respective ends that signifies loudness for a speaker and the number is used to make a decision as to whether to enter into the conversation mode, and wherein heuristic information is reviewed to make a decision as to whether to enter into the conversation mode, and wherein the heuristic information is stored such that certain speech patterns can be used for future determinations as to whether to enter into the conversation mode.

* * * * *